(12) United States Patent
Davis

(10) Patent No.: US 9,503,343 B2
(45) Date of Patent: Nov. 22, 2016

(54) METHOD AND SYSTEM FOR DETECTING NETWORK TOPOLOGY CHANGE

(71) Applicant: Kevin Eugene Davis, San Antonio, TX (US)

(72) Inventor: Kevin Eugene Davis, San Antonio, TX (US)

(73) Assignee: CA, Inc., New York, NY (US)

( * ) Notice: Subject to any disclaimer, the term of this patent is extended or adjusted under 35 U.S.C. 154(b) by 252 days.

(21) Appl. No.: 13/715,454

(22) Filed: Dec. 14, 2012

(65) Prior Publication Data

US 2014/0173090 A1    Jun. 19, 2014

(51) Int. Cl.
  *G06F 15/16* (2006.01)
  *H04L 12/26* (2006.01)
  *H04L 12/721* (2013.01)

(52) U.S. Cl.
  CPC ........... *H04L 43/0852* (2013.01); *H04L 45/70* (2013.01)

(58) Field of Classification Search
  CPC ............ H04L 67/125; H04L 43/00; H04L 43/0852; H04L 45/70
  See application file for complete search history.

(56) References Cited

U.S. PATENT DOCUMENTS

| | | | |
|---|---|---|---|
| 8,661,295 B1 * | 2/2014 | Khanna et al. | H04L 67/125 714/43 |
| 2002/0087666 A1 * | 7/2002 | Huffman et al. | H04L 29/12009 709/220 |
| 2003/0208572 A1 * | 11/2003 | Shah et al. | 709/223 |
| 2005/0271071 A1 * | 12/2005 | Madhavapeddi et al. | 370/412 |
| 2010/0278086 A1 * | 11/2010 | Pochiraju et al. | 370/310 |
| 2013/0208620 A1 * | 8/2013 | Kaufman et al. | 370/254 |

* cited by examiner

*Primary Examiner* — Viet Vu
(74) *Attorney, Agent, or Firm* — Baker Botts L.L.P.

(57) ABSTRACT

A method for detecting a topology change in a communication network. The method includes measuring a minimum latency value of a communication between two devices in the communication network for each of a plurality of time cycles, identifying an increase in the minimum latency values among the plurality of time cycles, and detecting a topology change in response to a determination that the increase in minimum latency values is maintained for more than a predetermined number of time cycles.

13 Claims, 6 Drawing Sheets

METHOD AND SYSTEM FOR DETECTING NETWORK TOPOLOGY CHANGE

BACKGROUND

The present disclosure relates generally to detecting changes in the topology of a communication network.

BRIEF SUMMARY

The present disclosure relates generally to methods or systems for detecting changes in the topology of communication networks.

According to an embodiment of the disclosure, a method for detecting a topology change includes measuring a minimum latency value of a communication between two devices in a communication network for each of a plurality of time cycles; identifying an increase in the minimum latency value among the plurality of time cycles; and detecting a topology change in response to a determination that the increase in minimum latency values is maintained for more than a predetermined number of time cycles.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
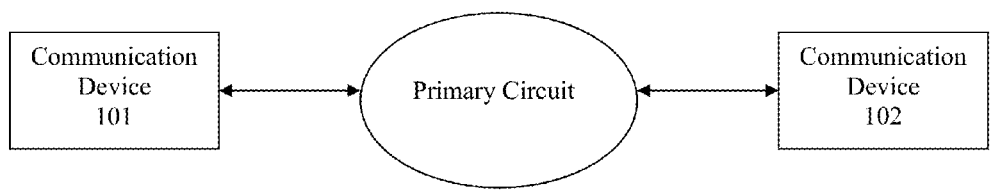
FIG. 1A is a diagram depicting a communication system according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1A, a communication network may comprise communication devices 101 and 102. Communication devices 101 and 102 may be devices, such as computers, servers, switches, routers, and the like, that transmit and receive data. Communication devices 101 and 102 may communicate with each other through a primary circuit of the communication network, e.g., wide area network. The primary circuit may comprise other devices and components, such as computers, servers, routers, switches, data cables, and the like, that may relay and carry data signals from communication device 101 to communication device 102.

Communication device 101 may be physically remote from communication device 102. For example, communication device 101 may be a corporate data center in a city and communication device 102 may be a remote client device located in a different city and connected to the corporate data center via the communication network. The remote client device may run applications resided on the corporate data center. Communication service between communication devices 101 and 102 may be provided by an Internet Service Provider ("ISP").

A network round trip time ("NRTT") for a data transmission between communication devices 101 and 102 may depend on factors such as: (1) serialization delay, (2) queue delay, (3) processing/forwarding delay, (4) distance delay, and (5) protocol delay (in both directions). The serialization delay may be determined by the bandwidth limit set by the ISP. The queue delay may be determined by the utilization of the communication network and the bandwidth limit. The processing delay may be insignificant, because communication latencies may be measured in milliseconds and the processing delay may be in the order of micro-seconds. The protocol delay may not be applicable to wide area networks, because wide area networks may implement full duplex communication settings. The distance delay may be due to a time required for a signal to travel through communication paths between communication devices 101 and 102. For example, signals may travel in a fiber optic cable at a speed of 5.5 micro-seconds per kilometer, e.g., approximately 1 millisecond for each additional 100 miles. Thus, in a long-distance communication, the distance delay may be the main factor in causing change to communication latencies, as compared with the other four factors.

Figure 1B:
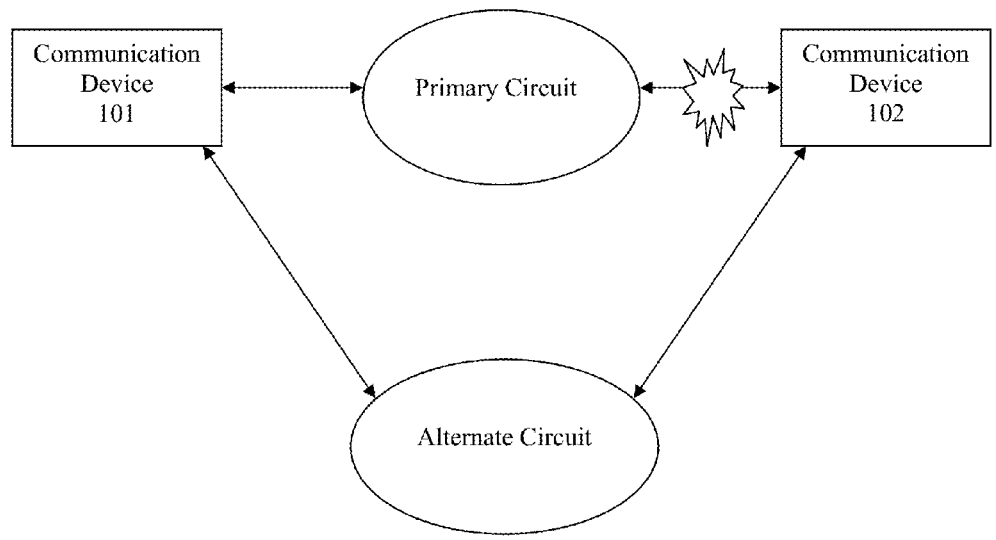
FIG. 1B depicts the communication system of FIG. 1A when a communication disruption occurs.

Referring to FIG. 1B, initially, the ISP may determine and establish the primary circuit, e.g., a working path, between communication devices 101 and 102. For example, the primary circuit may be a shortest path between communication devices 101 and 102 in the communication network in order to achieve optimal communication quality. Nevertheless, a disruption in the primary circuit may occur that may disconnect the communication between communication devices 101 and 102. In order to continue providing communication between communication devices 101 and 102, the ISP may cause a communication topology change by re-routing the communication between communication device 101 and 102 to an alternate circuit, e.g., a protected path.

In a fiber optic communication network, the fail over operation from a primary circuit to an alternate circuit may take place in less than 50 milliseconds. Thus, users may not notice that a topology change has occurred in the communication network. The alternate circuit may have a different and longer path than the primary circuit. For every 100 miles of additional communication path, the communication latency may increase by one millisecond. Users may begin to notice the deteriorating performance in latency sensitive applications when the communication latency is more than 3 millisecond. When a user notices that a latency sensitive application is experiencing performance deterioration, the user may notify a system administrator regarding this performance issue. The system administrator may attempt to determine the cause of the performance deterioration. Nevertheless, the system administrator may not be able to identify the cause of the performance deterioration, because the performance deterioration is caused by a topology change in the communication network implemented by the ISP to correct a disruption in the primary circuit.

The present disclosure may provide a method or a system that may detect a topology change in a communication network. As noted above, communication latencies may be caused mainly by the distance delay. Thus, a topology change, which may increase a distance of communication path, may be detected by monitoring and identifying changes to latency values. In particular, a topology change may be detected by monitoring minimum latency values in a plurality of time cycles and identifying changes to the minimum latency values among the plurality of time cycles.

Figure 2:
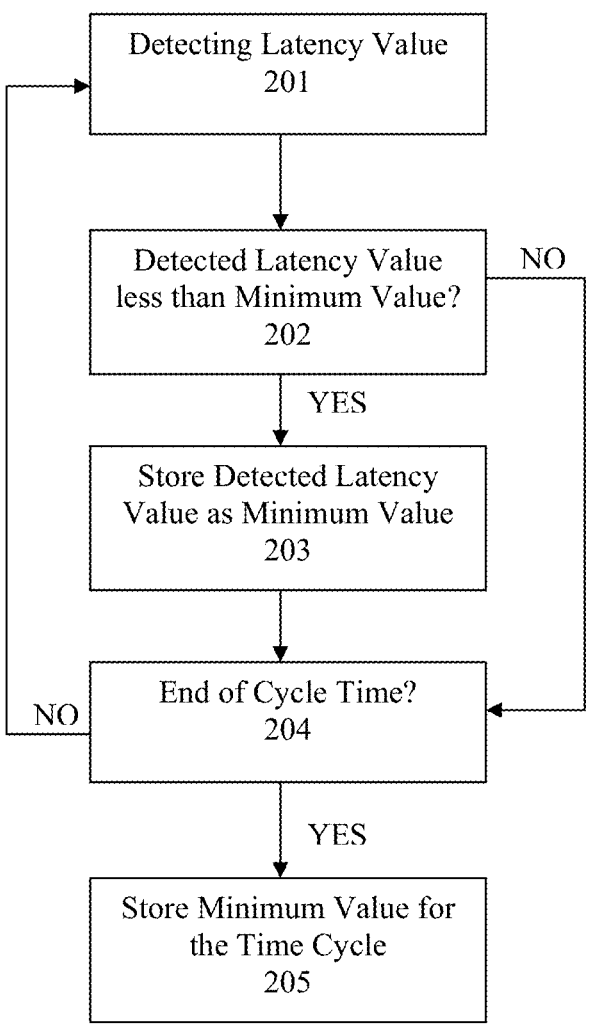
FIG. 2 is a flow chart depicting a method for measuring a minimum latency value in a time cycle according to an embodiment of the disclosure.

Referring to FIG. 2, a method for measuring minimum latency values in a plurality of time cycles may be illustrated in a flowchart. At step 201, the latency value for the communication between communication devices 101 and 102 may be detected when a time cycle starts. For example, a time T0, when a data packet is transmitted from communication device 101 to communication device 102, and a time T1, when a response data packet is received by communication device 101 from communication device 102, may be determined. A difference between T1 and T0 may be the communication latency between communication devices 101 and 102.

At step 202, the measured latency value may be compared with a minimum latency value. The minimum latency value may be initialized to the first measured latency value after the time cycle starts. When the measured latency value is less than the minimum latency value, the measured latency value may be stored as the new minimum latency value at step 203. When the measure latency value is not less than the minimum latency value, the process may proceed to step 204. At step 204, whether the time cycle has elapsed may be determined. When the time cycle has elapsed, the minimum value may be stored as the minimum value for the time cycle at step 205. When the time cycle has not elapsed, the proceed may return to step 201 for continue detection of latency values within the time cycle. This process may be performed for each time cycle to determine a minimum latency value for each time cycle.

Figure 3:
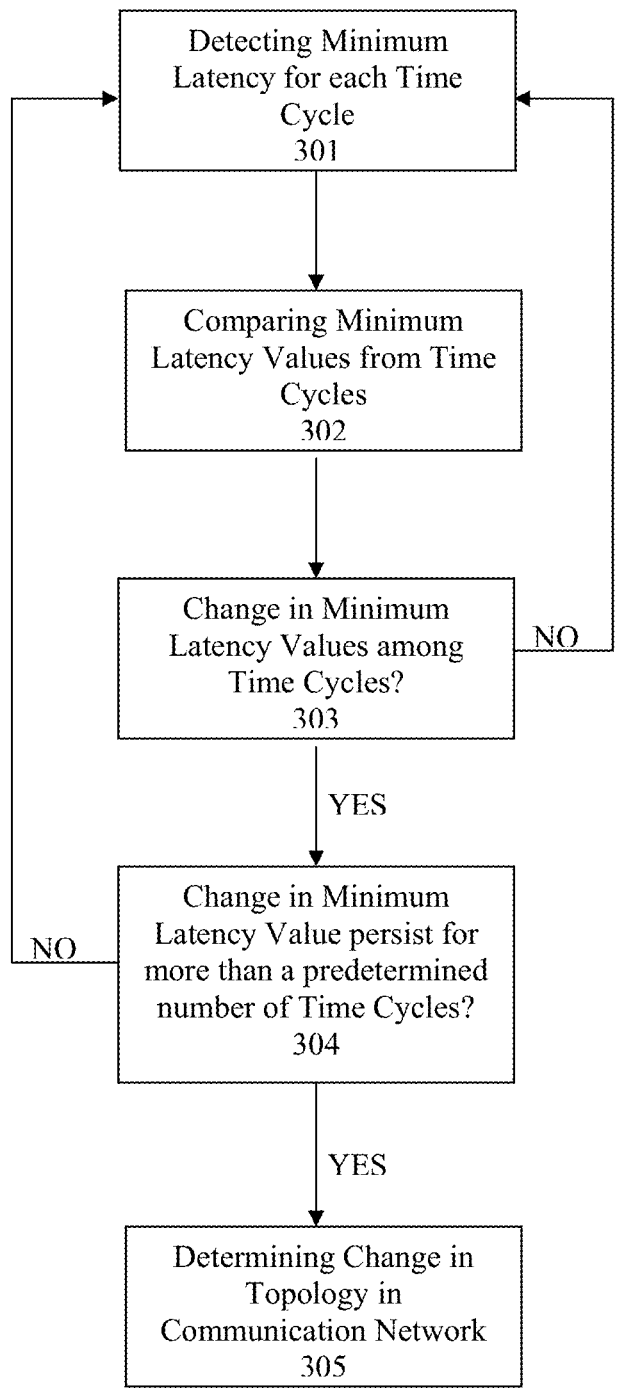
FIG. 3 is a flow chart depicting a method for determining a topology change in a communication network according to an embodiment of the disclosure.

Referring to FIG. 3, a method for determining a topology change in a communication network may be illustrated in a flowchart. At step 301, minimum latency values may be measured for a plurality of time cycles for the communication path between communication devices 101 and 102. Minimum latency values for each of the plurality of time cycles may be measured, as discussed above with respect to the method for measuring minimum latency values in FIG. 2. In another embodiment, minimum latency values may be measured for each communication path, e.g., a path designated via L2 topology or by target IP address/subnet, in a communication network. At step 302, minimum latency values measured from the plurality of time cycles may be compared. At step 303, changes in minimum latency values may be identified among the time cycles. When no changes are identified at step 303, the process may return to step 301 to continue measuring minimum latency values for each time cycle. When changes are identified at step 303, the change may be monitored to determine whether the change persists for more than a predetermined number of time cycles at step 304. A threshold value, e.g., 10, may be set as the predetermined number of time cycles. When the change lasts more than a number of time cycles indicated by the threshold value, a topology change may be detected. The threshold value may be set based on a latency sensitivity of an application utilizing the communication path. For example, the threshold value for a communication path utilized by a latency sensitive application, e.g., a stock trading application, may be set to be less than the threshold value for a communication path utilized by a non-latency sensitive application. When the change in minimum latency value persists for more than a predetermined number of time cycles, a change in topology of the communication path may be determined at step 305.

Figure 4:
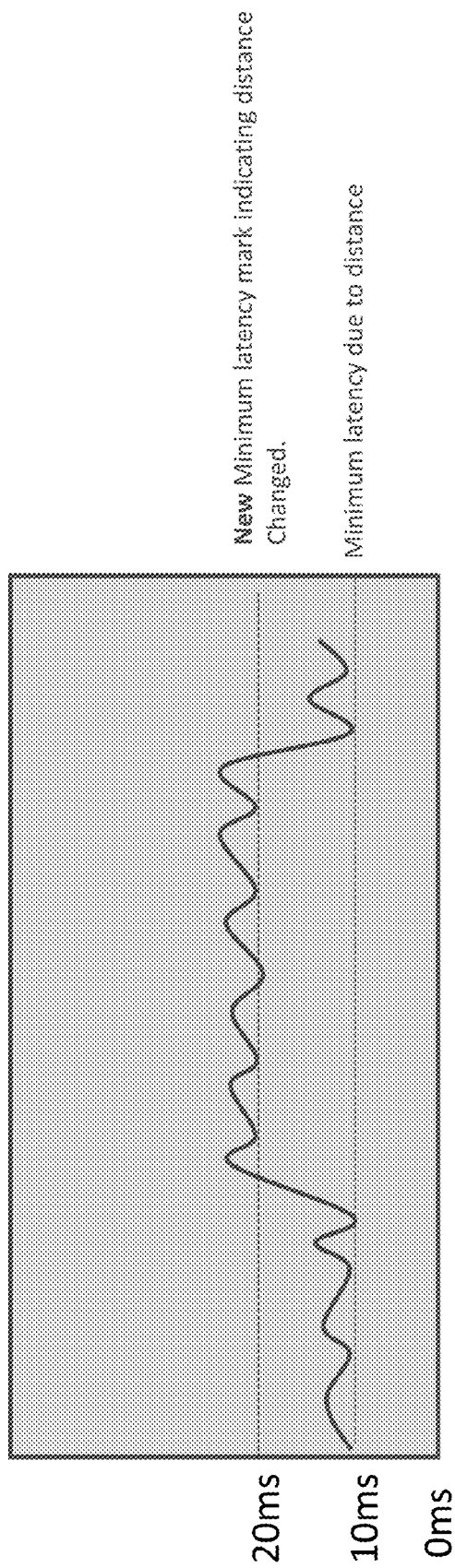
FIG. 4 is a graph illustrating minimum latency values v. time relationship according to an embodiment of the disclosure.

For example, a latency values v. time graph, as shown in FIG. 4, may be generated. In FIG. 4, a based line of minimum latency values of 10 millisecond is initially measured. Temporary fluctuations of minimum latency values may indicate certain non-distance related delays, such as queue delay due to temporary increase in utilization. The base line of minimum latency values then increases to 20 millisecond. This increase persists for a extended period of time. Thus, an increase of minimum latency values by 10 millisecond is detected. An persistent increase of 10 millisecond may indicate an increase in the travel distance of communication signal by about 1,000 miles round trip, because for each additional millisecond in latency, the distance traveled by the communication signal may increase by 100 miles. Thus, a topology change, which increases the communication distance of about 500 miles one way, may be detected. Accordingly, by continuously monitoring the latency values and detecting changes in minimum latency values, changes in topology of a communication path may be detected. In particular, based on the time and amount of increase in minimum latency values, the time when the topology changes and the amount of communication distance added due to the topology change may be determined.

When a topology change is detected, a network administrator or a user may be notified regarding the change. A latency value v. time graph may be generated for viewing by the network administrator or the user. The network administrator may confirm the persistent increase in minimum latency values and may contact an ISP to resolve the issue. For example, a communication path may be re-routed to an alternate circuit by the ISP due to a network disruption to a primary circuit. Nevertheless, in order to avoid a bouncing condition, in which the communication path continuously switches back and forth between the primary and alternate circuits, the ISP may not switch the communication path back to the primary circuit automatically. Thus, the ISP may continue to use the alternate circuit indefinitely, without notifying the clients or users. By utilizing the above methods, the network administrator may proactively monitor latency values of a communication and may timely request that the ISP switch the communication path back to the primary circuit to improve communication quality.

Figure 5:
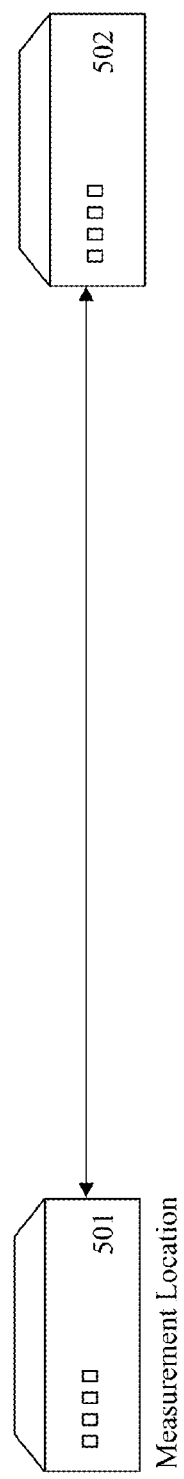
FIG. 5 depicts a communication network implementing a method for determining a topology change using Internet Protocol Service Level Agreements ("IP SLA") tests according to an embodiment of the disclosure.

The method for determining a topology change may be implemented in various aspects of a communication network. For example, referring to FIG. 5, the method for determining a topology change may be implemented in a communication between routers 501 and 502. Routers 501 and 502 may be CISCO routers that may implement Internet Protocol Service Level Agreements ("IP SLA") tests to detect latencies and jitters in the communication between routers 501 and 502. Thus, the latency values may be measured at router 501. By continuously measuring minimum latency values at router 501 for each time cycle and identifying changes to these minimum latency values, a topology change may be detected between the communication between routers 501 and 502.

Figure 6:
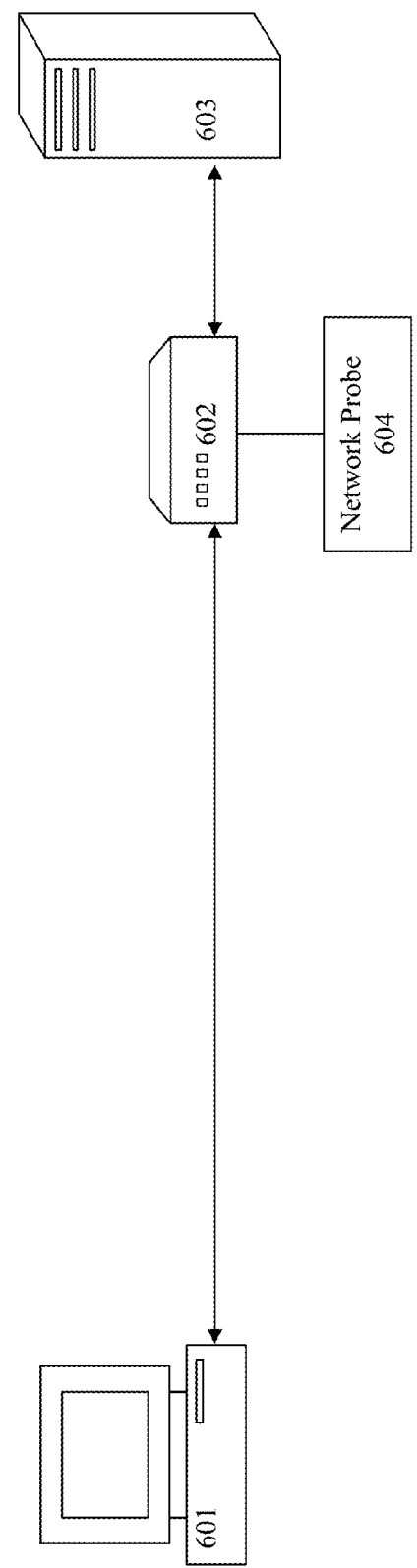
FIG. 6 depicts a communication network implementing a method for determining a topology change using an Application Delivery Analysis ("ADA") appliance according to an embodiment of the disclosure.

Referring to FIG. 6, the method for determining a topology change may be implemented in a Transmission Control Protocol ("TCP") communication between a client computer 601 and a server 603. In particular, server 603 may be connected to a switch 602. Server 603 may receive and transmit data through switch 602. An Application Delivery Analysis ("ADA") device 604 may be connected to switch 602. ADA device may passively monitor server 603's communication by monitoring incoming and outgoing communications at switch 602. Client computer 601 and server 603 may perform three-way handshake to initiate a communication. In particular, client computer 601 may send a synchronized request "SYN" to server 603. Server 603 may respond with "SYN ACK" indicating receipt of the request and may open a duplex connection with client computer 601 to allow simultaneous incoming and outgoing communications. Client computer 601 then may send an acknowledgement "ACK" acknowledging the SYN request to server 603. Each of the packet size of these requests and responses may be uniform, e.g., 64 bytes. Further, the three-way handshake may not be subject to MICROSOFT's delay acknowledgement. Thus, latency delays between client computer 601 and server 603 may be attributed mainly to distance delay. Accordingly, latency values for the communication between client computer 601 and server 603 may be used to detect a topology change. For example, latency values may be measured by measuring a time difference between T0, when "SYN ACK" is sent by server 603, and T1, when "ACK" is sent by client computer 601.

Figure 7:
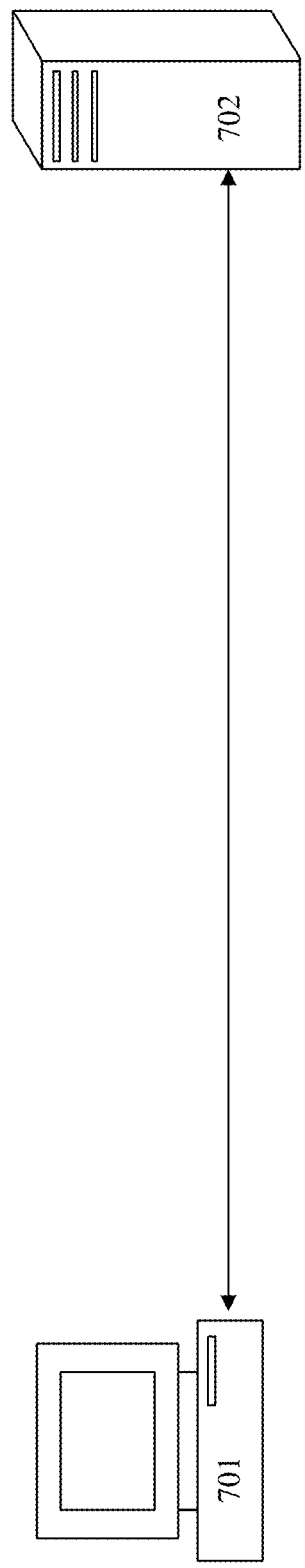
FIG. 7 depicts a communication network implementing a method for determining a topology change using Internet Control Message Protocol ("ICMP") echo requests and echo responses according to an embodiment of the disclosure.

Referring to FIG. 7, the method for determining a topology change may be implemented in an Internet Control Message Protocol ("ICMP") communication between a client computer 701 and a server 702. For example, client computer 701 may sent an ICMP echo request, e.g., ping, to server 702 and server 702 may send an ICMP echo response back to client computer 701. Thus, latency values for the ping operations may be measured and used to determine a topology change between client computer 701 and server 702.

Figure 8:
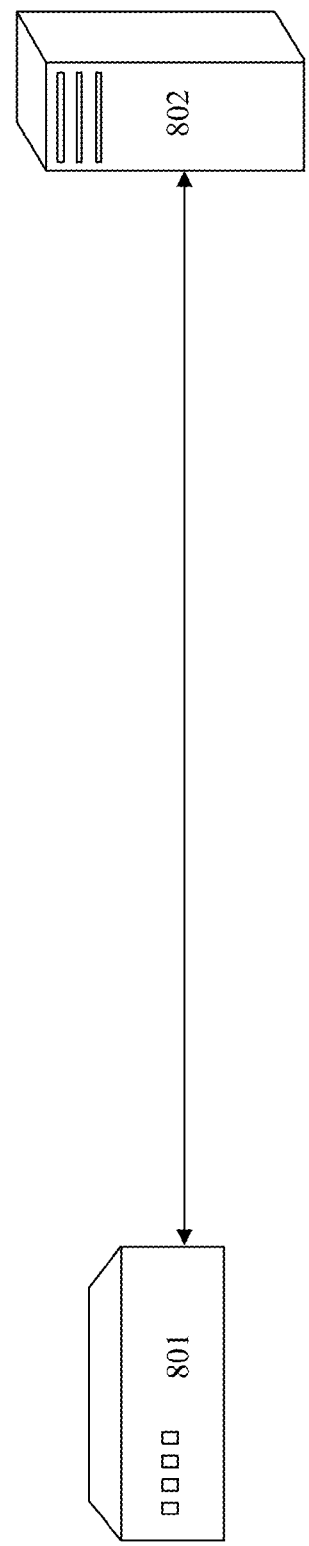
FIG. 8 depicts a communication network implementing a method for determining a topology change using NetFlow enabled devices according to an embodiment of the disclosure.

Referring to FIG. 8, the method for determining a topology change may be implemented in a communication between a NetFlow enabled router 801 and a server 802. Router 801 may be a CISCO NetFlow enabled router. For example, router 801 may monitor communication traffic to collect statistics of communication such as source IP address, source destination, port, condition of TCP session, amount of bytes, latency, and the like. Thus, latency values may be measured at router 801 to detect a topology change by utilizing the method for determining a topology change, as discussed above.

Accordingly, by implementing the method for detecting a topology change at various aspects of a communication network, a client of the ISP may detect, quantify, and report topology changes in a wide area network. Specifically, the time when the topology changes and the additional distance added to the communication path also may be determined.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for detecting a topology change, the method comprising:
   measuring an actual minimum latency value of a communication between two devices in a communication network for each of a plurality of time cycles;
   identifying, using a processor, an increase in the actual minimum latency value among the plurality of time cycles;
   determining a threshold value comprising a particular number of time cycles;
   detecting, using the processor, a topology change in response to a determination that the increase in actual minimum latency values is maintained for more than the threshold value; and
   generating a time v. actual minimum latency value graph including the actual minimum latency values measured for the plurality of time cycles.

2. The method according to claim 1, wherein
   the measuring an actual minimum latency value comprises:
   initializing a minimum value;
   detecting an actual latency value between the two devices; and
   storing the actual latency value as the minimum value when the actual latency value is less than the minimum value.

3. The method according to claim 1, wherein
   the two devices comprise two routers; and
   the measuring an actual minimum latency value is performed in an Internet Protocol Service Level Agreements (IP SLA) test in the communication between the two routers.

4. The method according to claim 1, wherein
   the two devices comprise a client computer and a server; and
   the measuring an actual minimum latency value comprises:
   monitoring Transmission Control Protocol (TCP) communication of the server at a communication switch connected to the server;
   measuring a time difference between a first time when a synchronization acknowledgement is sent from the server to the client computer and a second time when an acknowledgement is sent from the client computer to the server in response to the server.

5. The method according to claim 1, wherein
   the two devices comprise a client computer and a server; and
   the measuring an actual minimum latency value comprises
   measuring a time difference between a first time when an Internet Control Message Protocol (ICMP) echo request is sent from the client computer to the server and a second time when an ICMP echo response is sent from the server to the client computer.

6. The method according to claim 1, wherein
the two devices comprise a NetFlow enabled router and a server; and
the measuring an actual minimum latency value comprises monitoring communication statistics including at least a latency value of the communication between the two devices at the NetFlow enabled router.

7. A system for detecting a topology change, the system comprising:
a processor; and
a computer-readable storage medium storing computer-readable instructions, which when executed by the processor, cause the processor to perform:
measuring an actual minimum latency value of a communication between two devices in a communication network for each of a plurality of time cycles;
identifying an increase in the actual minimum latency values among the plurality of time cycles;
determining a threshold value comprising a particular number of time cycles;
detecting a topology change in response to a determination that the increase in actual minimum latency values is maintained for more than the threshold value; and
generating a time v. actual minimum latency value graph including the actual minimum latency values measured for the plurality of time cycles.

8. The system according to claim 7, wherein
the measuring an actual minimum latency value comprises:
initializing a minimum value;
detecting an actual latency value between the two devices; and
storing the actual latency value as the minimum value when the actual latency value is less than the minimum value.

9. The system according to claim 7, wherein
the two devices comprise two routers; and
the measuring an actual minimum latency value is performed in an Internet Protocol Service Level Agreements (IP SLA) test in the communication between the two routers.

10. The system according to claim 7, wherein
the two devices comprise a client computer and a server; and
the measuring an actual minimum latency value comprises:
monitoring Transmission Control Protocol (TCP) communication of the server at a communication switch connected to the server;
measuring a time difference between a first time when a synchronization acknowledgement is sent from the server to the client computer and a second time when an acknowledgement is sent from the client computer to the server in response to the server.

11. The system according to claim 7, wherein
the two devices comprise a client computer and a server; and
the measuring an actual minimum latency value comprises
measuring a time difference between a first time when an Internet Control Message Protocol (ICMP) echo request is sent from the client computer to the server and a second time when an ICMP echo response is sent from the server to the client computer.

12. The method according to claim 7, wherein
the two devices comprise a NetFlow enabled router and a server; and
the measuring an actual minimum latency value comprises monitoring communication statistics including at least a latency value of the communication between the two devices at the NetFlow enabled router.

13. A computer program product comprising:
a computer readable storage medium having computer readable program code embodied therewith, the computer readable program code comprising:
computer readable program code configured to measure an actual minimum latency value of a communication between two devices in a communication network for each of a plurality of time cycles;
computer readable program code configured to identify an increase in the actual minimum latency value among the plurality of time cycles;
computer readable program code configured to determine a threshold value comprising a particular number of time cycles;
computer readable program code configured to detect a topology change in response to a determination that the increase in actual minimum latency values is maintained for more than the threshold value; and
computer readable program code configured to generate a time v. actual minimum latency value graph including the actual minimum latency values measured for the plurality of time cycles.

* * * * *